United States Patent [19]
Saito

[11] Patent Number: 5,225,914
[45] Date of Patent: Jul. 6, 1993

[54] IMAGE READING APPARATUS
[75] Inventor: Yuichi Saito, Hadano, Japan
[73] Assignee: Ricoh Company, Ltd., Tokyo, Japan
[21] Appl. No.: 612,479
[22] Filed: Nov. 14, 1990
[30] Foreign Application Priority Data
  Nov. 15, 1989 [JP] Japan .................................. 1-294950
[51] Int. Cl.⁵ .............................................. H04N 1/00
[52] U.S. Cl. ..................................... 358/404; 358/406; 358/412
[58] Field of Search ............... 358/400, 403, 404, 406, 358/434, 437, 468, 486, 426, 261.4, 444, 412

[56] References Cited
U.S. PATENT DOCUMENTS

| | | | |
|---|---|---|---|
| 4,160,279 | 7/1979 | Fuwa | 358/426 |
| 4,949,190 | 8/1990 | Thompson | 358/400 |
| 4,975,783 | 12/1990 | Takaoka | 358/444 |

FOREIGN PATENT DOCUMENTS

| | | | |
|---|---|---|---|
| 57-148467 | 9/1982 | Japan | 358/404 |
| 58-205372 | 11/1983 | Japan | 358/404 |

Primary Examiner—Edward L. Coles, Sr.
Assistant Examiner—Thomas D. Lee
Attorney, Agent, or Firm—Oblon, Spivak, McClelland, Maier & Neustadt

[57] ABSTRACT

An image reading apparatus includes a scanner for scanning a medium, a buffer for storing the image data output from the scanner, a first processing circuit for processing the image data supplied from the buffer in accordance with a predetermined procedure and for outputting a first process image data, a second processing circuit for processing, at different times, the image data supplied from the buffer and the first process image data output from the first processing circuit in accordance with a predetermined procedure, and a controller for supplying the image data in the buffer to the second processing circuit when the amount of image data stored in the buffer is greater than a predetermined reference value, and for supplying the first process image data output from the first processing circuit to the second processing circuit when the amount of image data stored in the buffer is less than the predetermined reference value.

7 Claims, 8 Drawing Sheets

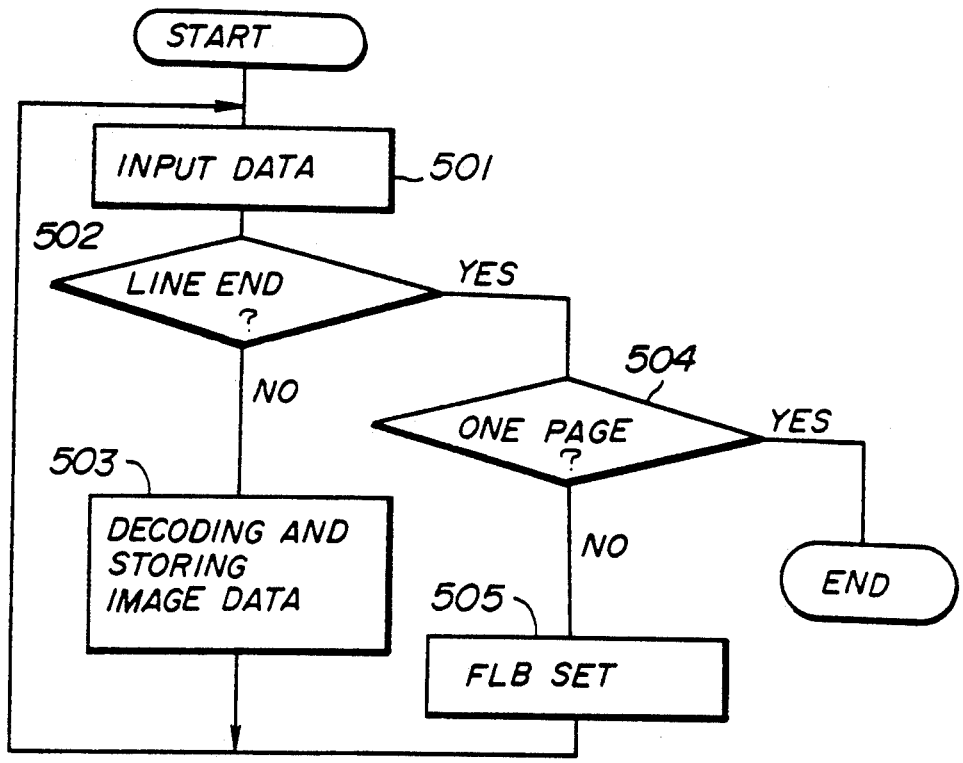
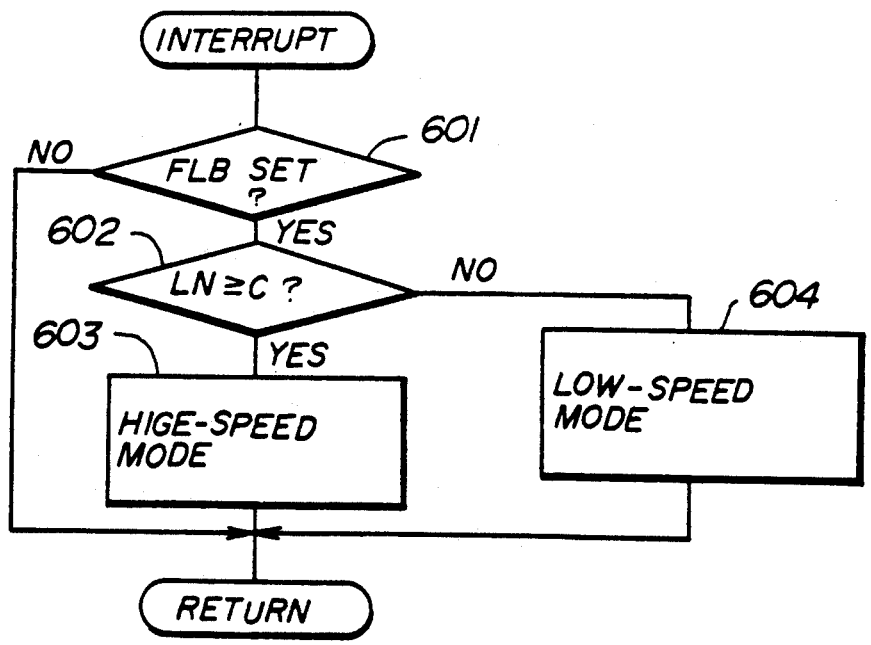

IMAGE READING APPARATUS

BACKGROUND OF THE INVENTION

The present invention generally relates to an image reading apparatus having a line buffer, and more particularly to an image reading apparatus having a line buffer used in a facsimile set and so on.

An image reading apparatus, such as a scanner in a facsimile set, has a line image sensor in which a plurality of photoelectric conversion elements are arranged in a line. The line image sensor scans every line of a medium (such as a document) and outputs an image signal corresponding to an image formed on the medium.

An image reading apparatus has been proposed, in which the image signal output from the line image sensor is stored in a memory. The amount of information included in the image signal is very large, so that, in this type of image reading apparatus, the image signal is coded and compressed. Then, coded data which is obtained by the coding and the compressing of the image signal is stored in a memory.

Now, to increase the reading speed in the image reading apparatus, it is necessary at least either to increase the operation speed in the line image sensor, to increase the scanning speed of the line image sensor, or to increase the operation speed in an operation system in which the image signal is coded and compressed. The operation speed in the line image sensor is determined by the efficiency of a semiconductor device of the line image sensor. For example, in a case where the line image sensor scans the document while the document is being moved in a predetermined direction, the scanning speed is determined by the moving speed of the document. Thus, to increase the scanning speed, it is necessary to use a driving source such as a stepping motor in which a large driving force for moving the document can be generated. The operation speed in the operation system is determined by the efficiency of a microcomputer, a digital processing processor and so on which are used in the operation system.

Thus, in the conventional image reading apparatus, to increase the reading speed, at least either the operation speed in the line image sensor, the scanning speed of the line image sensor, or the operation speed in the operation system is improved with due regard to the total cost of the image reading apparatus.

In addition, another image reading apparatus has been proposed, in which the image signal output from the line image sensor is stored in a line buffer and then the image signal read out from the buffer is coded and compressed. According to this type of image reading apparatus, the process for coding and compressing the image signal can be performed by using a processor whose processing speed is relatively low.

However, the conventional image reading apparatus having the line buffer described above has the following disadvantage.

The time required for the coding and compressing of the image signal for one line changes in accordance with the amount of information represented by the image signal. Thus, in a case where the image signal for one line is stored in the buffer for a predetermined time, when the line image sensor successively scans the lines in which the required time for the coding and compressing of the image signal is large, there is a possibility that the line buffer will overflow with the image signal. In this case, before the line buffer overflows with the image signal, it is necessary to stop scanning the document. However, when the line image sensor starts scanning the document in the state where the scanning of the document is stopped, it is necessary to use a scanning system generating a large driving force for moving the document and it is also necessary for the line image sensor to stably scan the document from the start of the scanning. For example, when the scanning system has a stepping motor for moving the document, the starting torque of the stepping motor must be large. As a result, the cost of the scanning system increases.

SUMMARY OF THE INVENTION

Accordingly, a general object of the present invention is to provide a novel and useful image recording apparatus in which the disadvantages of the aforementioned prior art are eliminated.

A more specific object of the present invention is to provide an image recording apparatus in which it is possible to read the image at a high speed and prevent the cost thereof from increasing.

The above objects of the present invention are achieved by an image recording apparatus comprising scanning means for scanning a medium on which an image is formed and for outputting an image data corresponding to the image on the medium; buffer means having a predetermined capacity, coupled to the scanning means, for storing the image data output from the scanning means; first processing means, coupled to the buffer means, for processing the image data supplied from the buffer means in accordance with a predetermined procedure and for outputting a first process image data; second processing means for processing, at different times, the image data supplied from the buffer means and the first process image data output from the first processing means in accordance with a predetermined procedure; and control means for supplying the image data in the buffer means to the second processing means when the amount of image data stored in the buffer means is greater than a predetermined reference value, and for supplying the first process image data output from first processing means to the second processing means when the amount of image data stored in the buffer means is less than the predetermined reference value.

The above objects of the present invention are also achieved by an image reading apparatus comprising scanning means for scanning a medium on which an image is formed and outputting an image data corresponding to the image on the medium; buffer means having a predetermined capacity, coupled to the scanning means, for storing the image data output from the scanning means; processing means, coupled to the buffer means, for processing the image data supplied from the buffer means in accordance with a predetermined procedure; and control means for controlling a scanning speed of the scanning means in accordance with the amount of image data stored in the buffer means.

Additional objects, features and advantages of the present invention will become apparent from the following detailed description when read in conjunction with the accompanying drawings.

BRIEF DESCRIPTION OF THE DRAWINGS

FIG. 14 is a flow chart showing a third example of a main process for reading an image for one page; and FIG. 15 is a flow chart showing a third example of an interrupt process performed while the main process shown in FIG. 14 is being performed.

DESCRIPTION OF THE PREFERRED EMBODIMENTS

A description will now be given of a first embodiment of the present invention with reference to the drawings.

Figure 1:
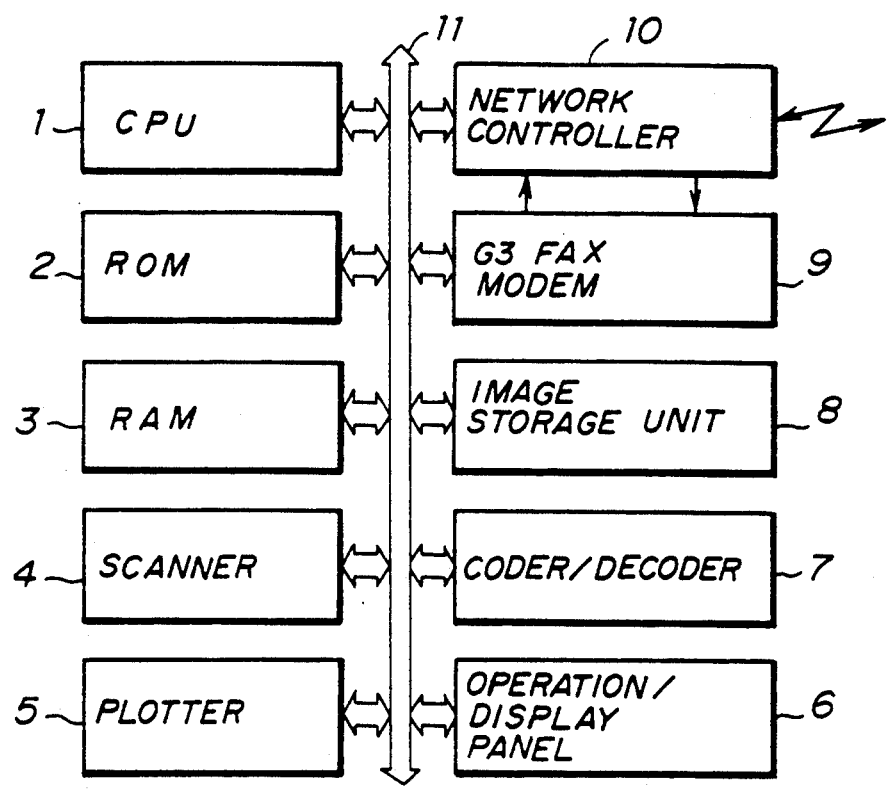
FIG. 1 is a block diagram illustrating a facsimile set including a image reading apparatus according to an embodiment of the present invention.

Referring to FIG. 1, which shows a group three (G3) facsimile set, the facsimile set has a CPU 1 (Central Processing Unit), a ROM 2 (Read Only Memory), a RAM 3 (Random Access Memory), a scanner 4 and a plotter 5. The facsimile set also has an operation/display panel 6, a coder/decoder 7, an image storage unit 8, a modem 9 and a network controller 10.

The CPU 1 controls each part of the facsimile set and performs a process in accordance with a predetermined transmission control procedure. The ROM 2 stores programs which are run in the CPU 1 and various data required for processes performed in accordance with the programs. A working area for the CPU 1 is provided on the RAM 3, and the RAM 3 stores various data which are required for the group three (G3) facsimile set. The scanner 4 scans a document at a predetermined resolution and reads an image on the document. The plotter 5 records the image at a predetermined resolution on the recording sheet. The operation/display panel 6 is an interface between the facsimile set and a user and has various operation keys and various display devices. The coder/decoder 7 codes and compresses image signals, and decodes coded and compressed image information into original image information. Coded and compressed image information is supplied to the image storage unit 8. The image storage unit 8 has a capacity which amounts to a predetermined plurality of pages. The modem 9 for the group three (G3) facsimile set performs a modulation and a demodulation for the transmission of the digital data via the public telephone line. The network controller 10 connects the facsimile set to the public telephone line and releases it therefrom. The network controller 10 has a function which automatically sends and receives information.

The CPU 1, the ROM 2, the RAM 3, the scanner 4, the plotter 5, the operation/display panel 6, the coder/decoder 7, the image storage unit 8, the modem 9 and the network controller 10 are respectively connected to a system bus 11. The data is mainly transmitted via the system bus 11 among the above parts. The modem 9 and the network controller 10 directly supply the data to each other.

Figure 2:
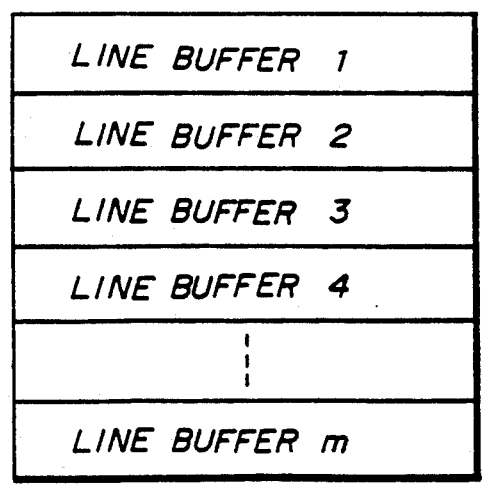
FIG. 2 is a diagram showing a structure of a line buffer.

The RAM 3 has a line buffer. The line buffer can store image data for m lines as shown in FIG. 2. The image data for each line read by the scanner 4 is stored in the line buffer. The line buffer is also used for supplying the image data to the plotter 5. That is, the image data is stored in the line buffer, and then the image data for each line is output from the line buffer and supplied to the plotter 5.

A description will now be given of a control system of the scanner 4 with reference to FIG. 3.

Figure 3:
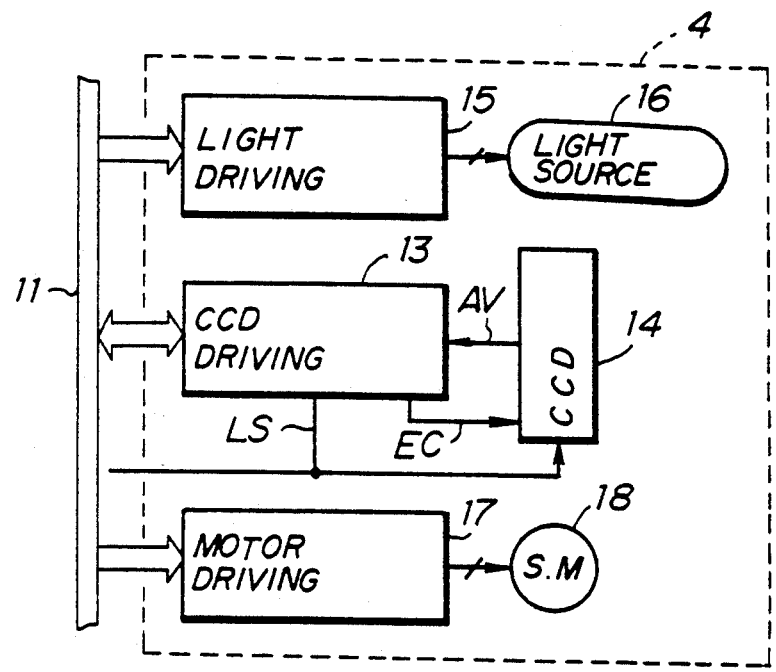
FIG. 3 is a block diagram illustrating the scanner shown in FIG. 1.

Referring to FIG. 3, a CCD driving portion 13 drives a CCD line image sensor 14. The CCD line image sensor 14 reads every line of the image on the document. The CCD driving portion 13 supplies a line synchronous signal (LS) and a pixel clock signal (ES) to the CCD line image sensor 14. The CCD line image sensor 14 transmits every line of the image signal in synchronism with the line synchronous signal (LS). The CCD line image sensor 14 outputs the image signal corresponding to each pixel in synchronism with the pixel clock signal. The line synchronous signal (LS) is supplied, as an interrupt signal, via the system bus 11 to the CPU 1. The CCD line image sensor 14 outputs an analog image signal (AV). The CCD driving portion 13 processes the analog image signal (AV) output from the CCD line image sensor 14 in accordance with the image processing, such as a processing in which the image signal is revised, and outputs a digital image data corresponding to the analog image signal (AV). The digital image data generated by the CCD driving portion 13 is transmitted via the system bus 11 to the CPU 1. A light driving portion 15 drives a light source 16 which irradiates an area on the document where the CCD line image sensor 14 scans. A motor driving portion 17 drives a stepping motor 18 used for moving the document in a predetermined direction.

A description will now be given of a control system of the plotter 5 with reference to FIG. 4.

Figure 4:
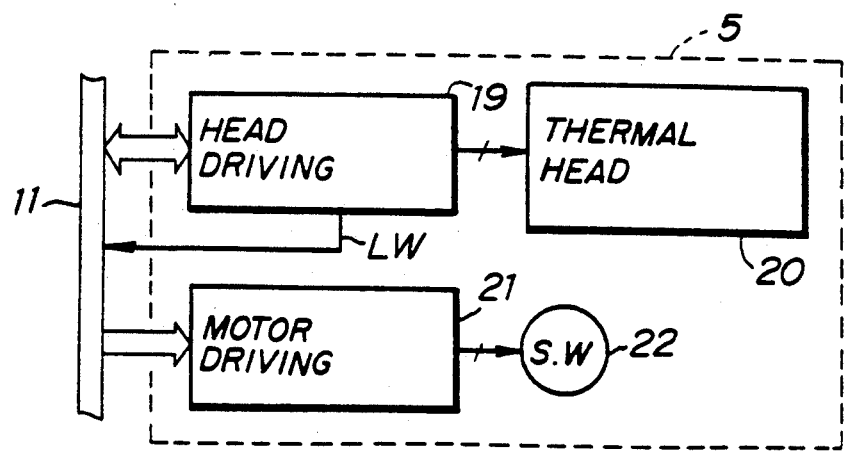
FIG. 4 is a block diagram illustrating the plotter shown in FIG. 1.

Referring to FIG. 4, a thermal head 20 records the image on every line of a thermal recording sheet (not shown in FIG. 4). A head driving portion 19 drives the thermal head in accordance with the image data. The head driving portion 19 outputs a recording line synchronous signal (LW) which represents the starting time of the recording for one line. The recording line synchronous signal (LW) is transmitted via the system bus 11 to the CPU 1. A motor driving portion 21 drives a stepping motor used for moving the thermal recording sheet.

Figure 5:
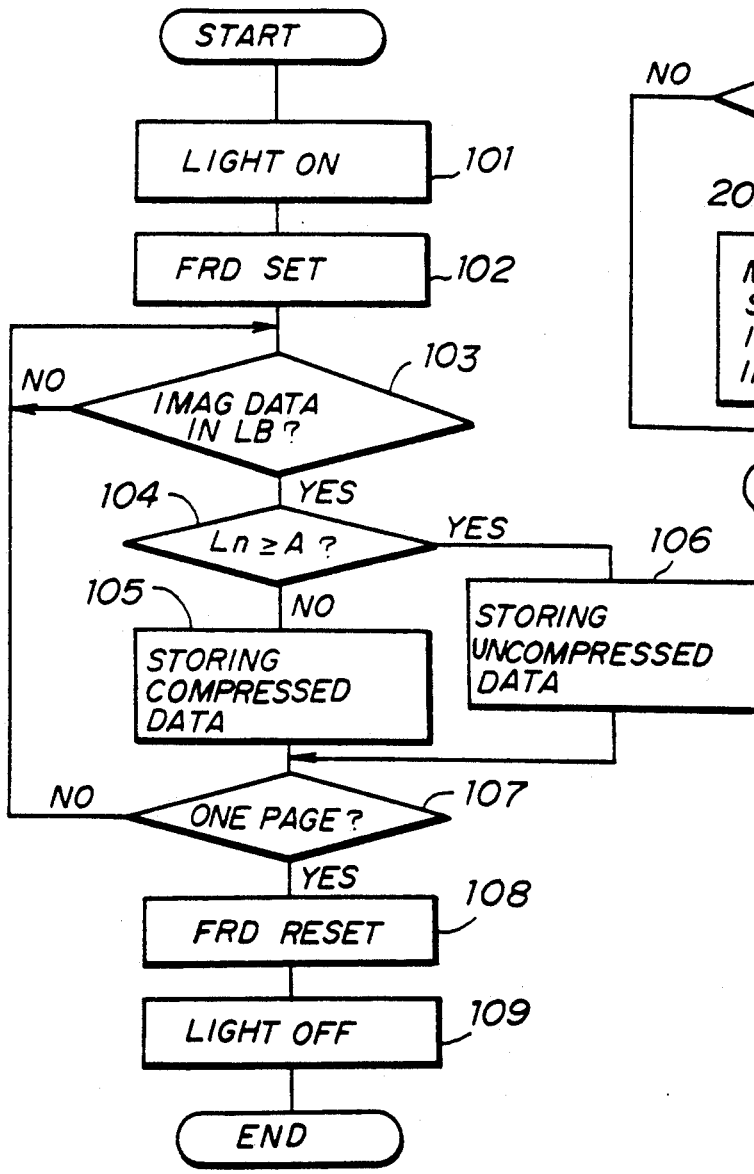
FIG. 5 is a flow chart showing a first example of a main process for reading an image for one page.
Figure 6:
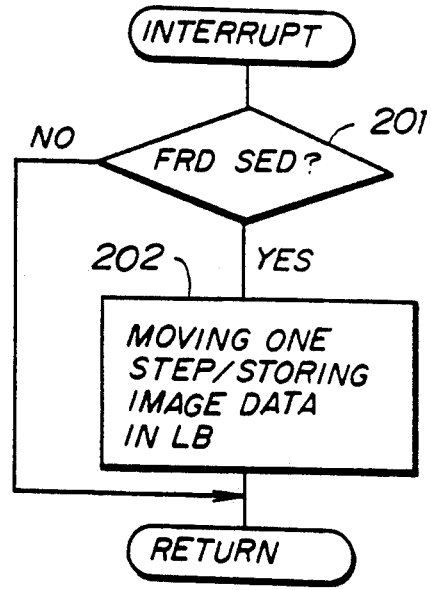
FIG. 6 is a flow chart showing a first example of an interrupt process performed while the main process shown in FIG. 5 is being performed.

The CPU 1 controls the scanner 4 in accordance with the flow charts shown in FIGS. 5 and 6.

FIG. 5 shows an example of a main process which is performed by the CPU 1 when the scanner 4 reads one page of the document. FIG. 6 shows an example of an interrupt process which is performed by the CPU 1 when the line synchronous signal (LS) is supplied to the CPU 1.

In Step 101, CPU 1 gives an instruction for turning on the light source 16 of the scanner 4 to the light driving portion 15 so that the light source 16 turns on. In step 102, the flag (FDR) is set, which flag represents a state where it is possible to perform the interrupt process shown in FIG. 6. In this condition, the scanner 4 scans every line of the document.

Then, step 103 determines whether or not the image data for one line or more is stored in the line buffer. When the image data for one line or more is stored in the line buffer and the result obtained in step 103 is YES, step 104 determines whether or not the number of lines for the image data stored in the line buffer is equal to or greater than a predetermined reference value A. When the result in step 104 is NO, there is sufficient capacity in the line buffer for storing the image data, so that step 105 is performed. In step 105, the image data is read out from the line buffer starting from the image data for the oldest line, coded and compressed by the coder/decoder 7, and then the coded and compressed image data is stored in a predetermined area in the image storage unit 8. On the other hand, when the result in step 104 is YES, the line buffer overflows if the coder/decoder 7 successively codes and compresses the image data, so that step 106 is performed. In step 106, the image data is read out from the line buffer starting from the image data for the oldest line, and then the image data read out from the line buffer is directly stored in the image storage unit 8.

When the process for one line is completed, step 107 determined whether or not the process for one page is completed. When the result in step 107 is NO, the process returns to step 103. Then the process for the next line is performed. On the other hand, when the result in step 107 is YES, the flag (FRD) is reset in step 108 so that the interrupt process shown in FIG. 6 is stopped, and the light driving portion 15 turns off the light source 15 in step 109. Thus the process for reading the image for one page of the document is completed.

In the interrupt process as shown in FIG. 6, step 201 determines whether or not the flag (FRD) is set. When the result in step 201 is YES, in step 202 the stepping motor 18 is driven by on step by the motor driving portion 17 and the digital image data for one line output from the CCD driving portion 13 is transmitted to the first line on an empty area in the line buffer. On the other hand, when the flag (FRD) has been reset and the result in step 201 is NO, the process immediately returns to the initial state in the interrupt process. By the process described above, the image data for one line is read.

Figures 7A, 7B, 8:
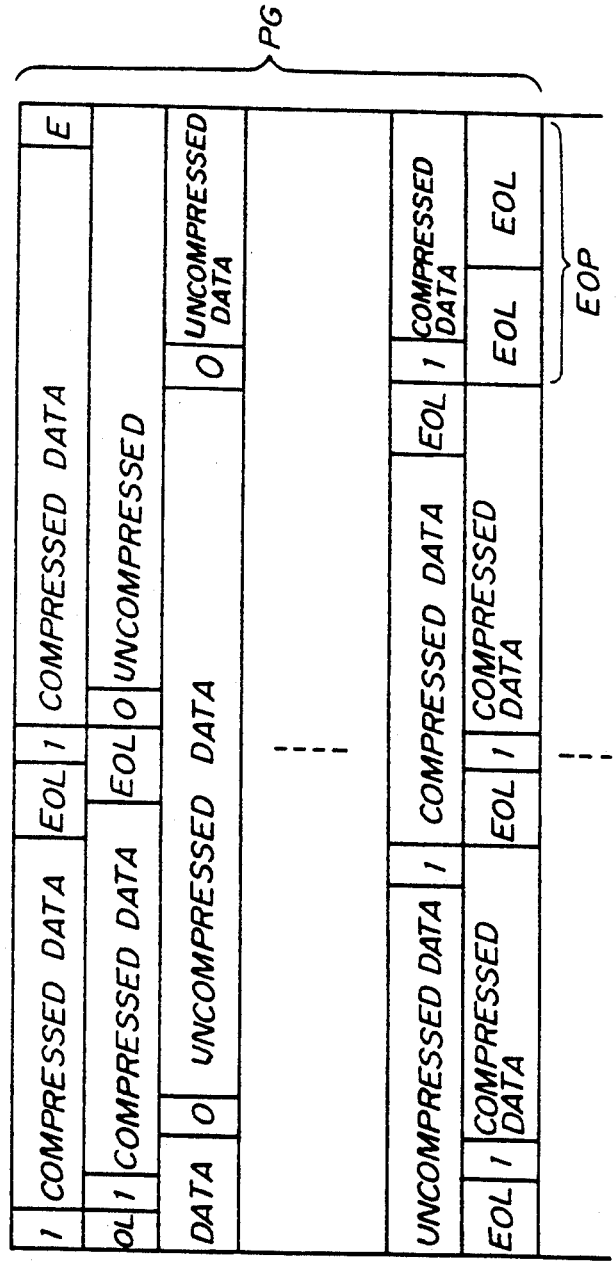
FIG. 7A is a diagram showing an example of a structure of a compressed image data.
FIG. 7B is a diagram showing an example of a structure of an uncompressed image data.
FIG. 8 is a diagram showing an example of the image data stored in the image storage unit.

FIG. 7A shows the format of the compressed image data stored in the image storage unit 8. FIG. 7B shows the format of an uncompressed image data which is not coded and compressed.

Referring to FIGS. 7A and 7B, the compressed image data and the uncompressed image data respectively have a data (DT) for one line and a flag (IF) which represents either the compressed image data or the uncompressed data. In the case of the compressed image data, the flag (IF) is "1", and in the case of the uncompressed image data, the flag (IF) is "0". The data (DT), in the compressed image data shown in FIG. 7A, includes a line end code (EOL) at an end of the data (DT). The line end code (EOL) is used for detecting the end of the data for one line when the image is reproduced. In the case of the uncompressed image data, when the counted number of bits in the data is equal to the number of the pixels for one line, the end of the data for one line is detected. A page end code (EOP) is provided at the end of the data for one page. The page end code (EOP) is, for example, formed of two line end codes (EOL), as shown in FIG. 8. It is also possible to provide the compressed dummy data for a white line as the page end code (EOP), at the end of the page. Further, another code can be used as the page end code (EOP).

The image data read out from the image storage unit 8 is decoded into an original image data, and finally converted into the image data to which predetermined information is added. Thus, even if the image data for one page has both the compressed image data and the uncompressed image data, the efficiency of the compressing of the image data for one page does not decrease.

In the above embodiment, the image data output from the scanner 4 is stored in the line buffer in the RAM 3 in synchronism with the line synchronous signal (LS). On the other hand, when the number of lines for the image data stored in the line buffer is less than the predetermined value A, the image data for one line output from the line buffer is coded and compressed by the coder/decoder 7, and then the compressed image data is stored in the image storage unit 8. When the number of lines for the image data stored in the line buffer is equal to or greater than the predetermined value A, the image data for one line output from the line buffer is not coded and compressed, and then the uncompressed data is directly stored in the image storage unit 8.

The scanner 4 scans the document independently of the coding and compressing of the image data. Thus, when the coder/decoder 7 successively codes and compresses the image data for lines in which the required time for coding and compressing the image data is large, the number of lines for the image data stored in the line buffer increases. When the number of lines is equal to or greater than the predetermined value A, the coder/decoder 7 does not code and compress the image data and thus the image data from the buffer is directly stored in the image storage unit 8.

A data transmission time which is a time required for transmitting the image data from the line buffer to the image storage unit 8 is normally shorter than the cycle time of the line synchronous signal (LS). Therefore, when the time required for coding and compressing the image data decreases, the number of lines for the image data stored in the line buffer decreases. As a result, it is possible for the scanner 4 to successively scan the document in a state where the line buffer does not overflow.

The reference value A for determining whether or not the image data is coded and compressed is determined on the basis of the scanning speed of the scanner 4, the capacity of the line buffer, the processing speed of the coder/decoder 7 and so on. The value A is, for example, determined as being a 90% of the lines in the line buffer.

In the above embodiment, the uncompressed image data is directly stored in the image storage unit 8 so that the line buffer is prevented from overflowing. In this case, as the uncompressed image data is stored in the image storage unit 8, the number of pages for which the image data is stored in the image storage unit 8 decreases.

A description will now be given of a second embodiment of the present invention, in which the aforementioned disadvantage is eliminated. In this embodiment, the facsimile set has the same structure as that shown in FIG. 1.

Figure 9:
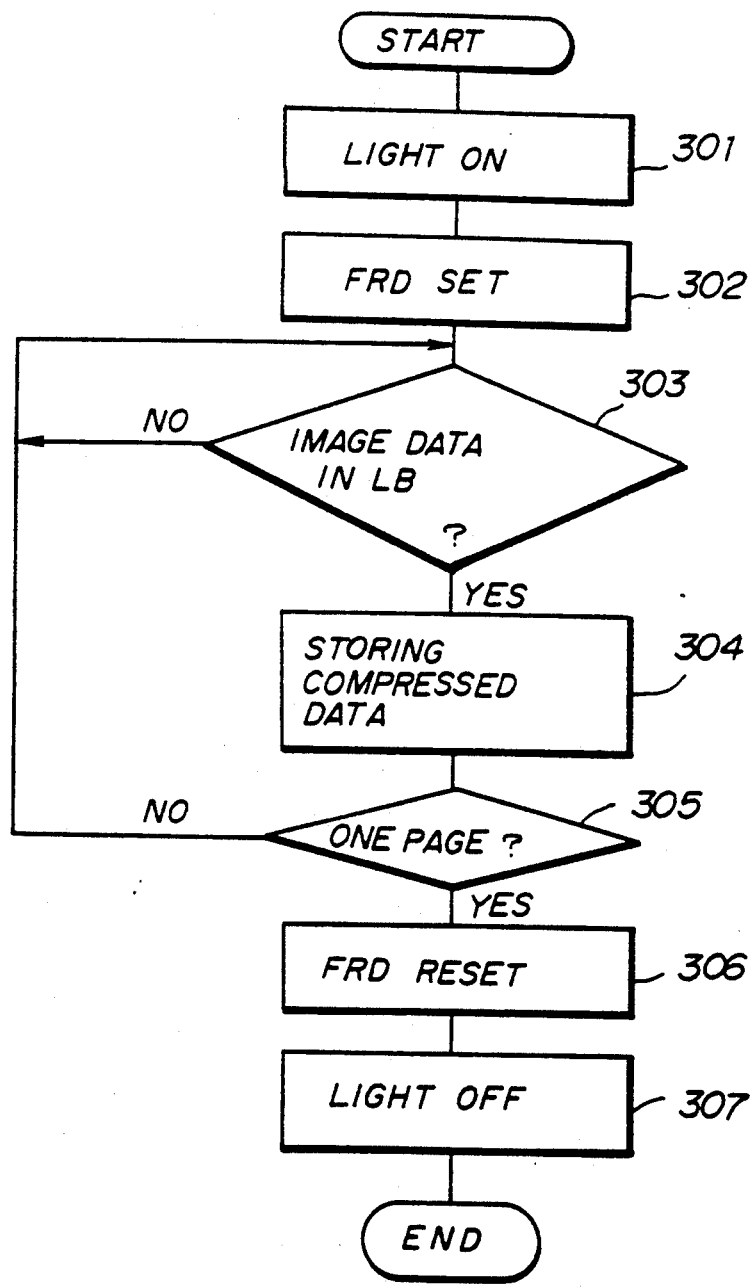
FIG. 9 is a flow chart showing a second example of a main process for reading an image for one page.
Figure 10:
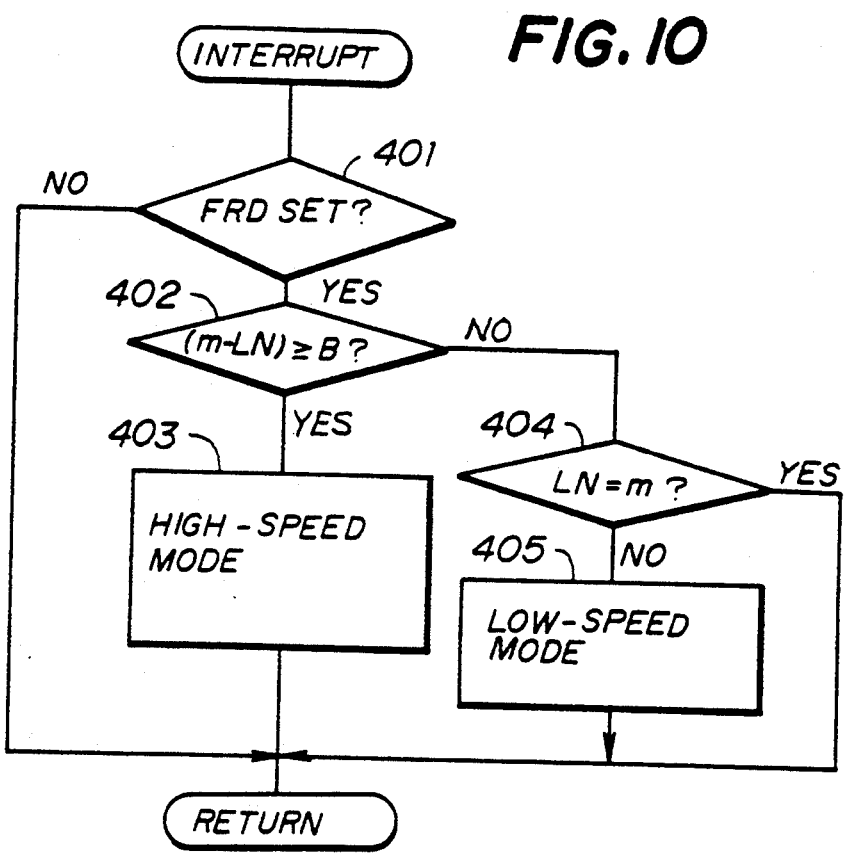
FIG. 10 is a flow chart showing a second example of an interrupt process performed while the main process shown in FIG. 9 being is performed.

FIG. 9 shows an example of a main process which is performed by the CPU 1 when the scanner 4 reads one page of the document. FIG. 10 shows an example of an interrupt process which is performed by the CPU 1 when the line synchronous signal (LS) is supplied to the CPU 1.

In step 301, the CPU 1 gives an instruction for turning on the light source 16 in the scanner 4 to the light driving portion 15 so that the light source 16 turns on. In step 302, the flag (FRD) is set, which flag represents a state where it is possible to perform the interrupt process shown in FIG. 10. In this condition, the scanner 4 scans the document.

Then, step 303 determines whether or not the image data for one line or more is stored in the line buffer. When the image data for one line or more is stored in the line buffer and the result in step 303 is YES, the image data is read from the line buffer starting from the image data for the oldest line in step 105. The image data read out from the line buffer is coded and compressed by the coder/decoder 7, and then the coded and compressed image data is stored in a predetermined area in the image storage unit 8.

When the process for one line is completed, step 305 determines whether or not the process for one page is completed. When the result in step 305 is NO, the process returns to step 303, and then the process for the next line is performed. On the other hand, when the result in step 305 is YES, the flag (FRD) is reset in step 306 so that the interrupt process is stopped, and the light driving portion 15 turns off the light source 16 in step 307. Thus the process for reading the image for one page of the document is completed.

In the interrupt process as shown in FIG. 10, step 401 determines whether or not the flag (FDR) is set. When the result in step 401 is YES, the step 402 determines whether or not the number of lines of an empty area having no data in the line buffer is equal to or greater than a predetermined reference value B. The number of lines of the empty area in the line buffer is obtained by a calculation which subtracts the number (LN) of lines for the image data stored in the line buffer from the total number (m) of the lines in the line buffer. That is, the calculation is performed in accordance with the formula (m−LN). When the result in step 402 is YES, the process is performed at a high-speed mode in step 403. In the high-speed mode process, the motor driving portion 17 drives the stepping motor 18 by one step at a first speed and the digital image data for one line output from the CCD driving portion 13 is transmitted to the first line on the empty area in the line buffer. On the other hand, when the result in step 402 is NO, step 404 determines whether or not the number (LN) of lines for the image data stored in the line buffer is equal to the total number (m) of the lines in the line buffer. When the result in step 404 is NO, the low-speed mode process is performed in step 405. In the low-speed mode process, the motor driving portion 17 drives the stepping motor 18 by one step at a second speed and the digital image data for one line output from the CCD driving portion 13 is transmitted to the first line on the empty area in the line buffer. The first speed of the stepping motor 18 at the high-speed mode is greater than the second speed thereof at the low-speed mode.

When the result in step 404 is YES, there is no empty area in the line buffer so that the moving of the document is stopped and the transmitting of the digital image data is stopped. Then the process returns to the initial state in the interrupt process. When the flag has been reset and the result in step 401 is NO, the process also immediately returns to the initial state in the interrupt process.

Figure 11:
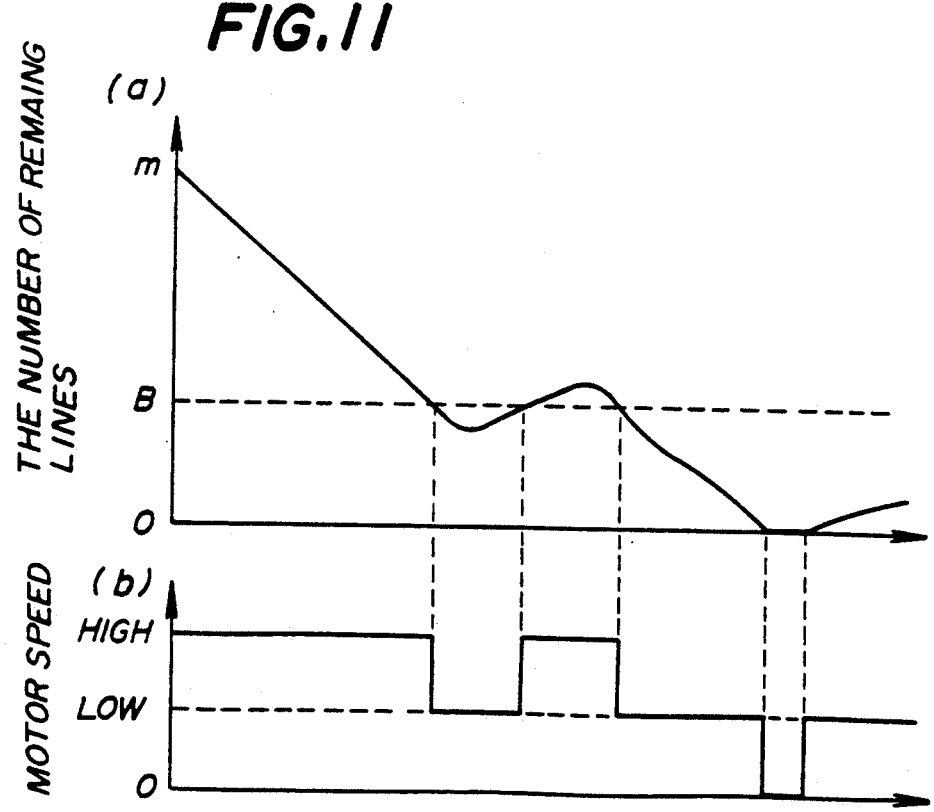
FIGS. 11(a) and 11(b) are graphs showing a relationship between the number of lines for which no image data is stored in the line buffer and a driving speed of the stepping motor.

As has been described above, while the image data is read out from the line buffer and the image data from the line buffer is coded and compressed, the stepping motor 18 for moving the document is controlled under at least one of three conditions in accordance with the number of the lines in the empty area in the line buffer. The three conditions are the high-speed mode, the low-speed mode and a stop mode in which the stepping motor 18 stops. That is, the stepping motor 18 is controlled as shown in FIG. 11. Referring to FIG. 11, when the number of the lines in the empty area in the line buffer is large, the stepping motor is controlled at the high-speed mode so that the document is moved at a high-speed. When the number of lines in the empty area in the line buffer is less than the reference value B, the stepping motor 18 is controlled at the low-speed mode so that the document is moved at a low-speed. The low-speed is, for example, half of the high-speed. In addition, when there is no empty area in the line buffer, the stepping motor 18 is controlled at the stop mode so that the moving of the document is stopped.

The four-phase stepping motor 18 is controlled as follows.

Figure 12:
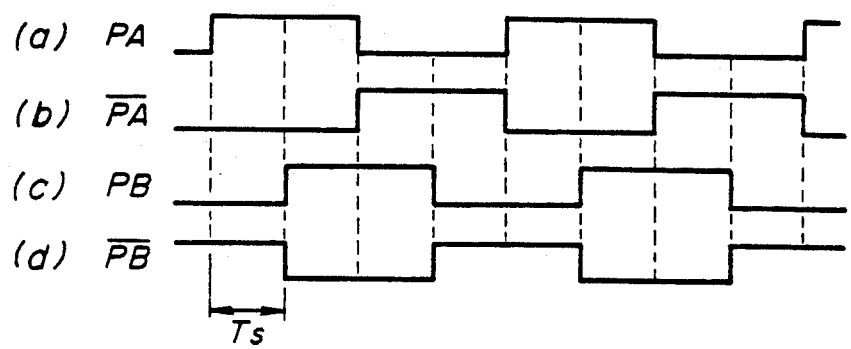
FIGS. 12(a)-12(d) are wave form charts showing a driving signal for driving the stepping motor by a two phase excitation method.
Figure 13:
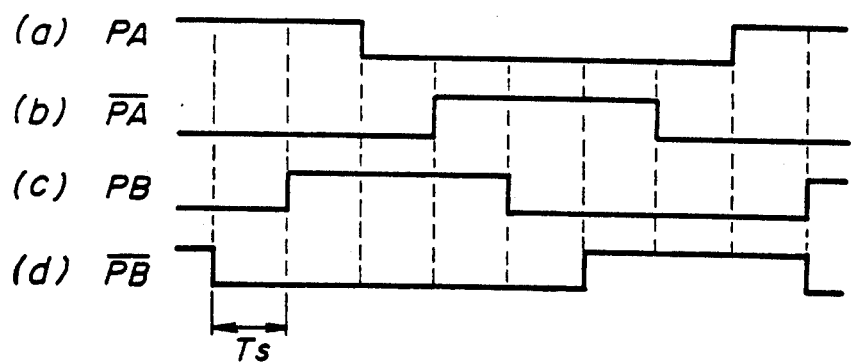
FIGS. 13(a)-13(d) are wave form charts showing a driving signal for driving the stepping motor by a one-two excitation method.

In the two-phase excitation method, the stepping motor 18 is driven by driving signals PA, $\overline{PA}$, $\overline{PB}$ and PB as shown in FIG. 12. In the one-two phase excitation method, the stepping motor 18 is driven by driving signals PA, $\overline{PA}$, PB and $\overline{PB}$ as shown in FIG. 13. An angle at which the stepping motor 18 rotates for a cycle time Ts for switching the phase in accordance with the two-phase excitation method is twice as large as that in accordance with one-two excitation method. Therefore, in the high-speed mode, the stepping motor 18 is driven in accordance with the two-phase excitation method, and in the low-speed mode, the stepping motor 18 is driven in accordance with the one-two phase excitation method. In this case, the line image sensor 14 reads the image for one line on the document in a first amount of time in the high-speed mode and reads the image for one line on the document in a second amount of time in the low-speed mode. Then the obtained digital image data is supplied to the line buffer. The duration of the first time is half that of the second time. The CCD driving portion 13 controls the line image sensor 14 as has been described above at the high-speed mode, the low-speed mode or the stop mode.

In the plotter 5, when the recording sheet is moved successively, the recording speed can be increased. The required time for decoding the image data supplied from the image storage unit 8 or the party changes in accordance with the coded and the compressed image data. Thus, when the plotter 5 records the image in accordance with the following recording control, it is possible to efficiently record the image. In addition, when the recording sheet is moved intermittently, the quality of the image recorded on the recording sheet ma be decreased. Thus, it is desirable that the recording sheet be moved successively.

FIG. 14 shows a main process in the CPU 1 when the image for one page is recorded in the recording sheet. FIG. 15 shows an interrupt process which is performed when the recording synchronous signal (LW) is generated.

The CPU 1 receives the image data read out from the image storage unit 8 in step 501. Then, step 502 determines whether or not the image data is the line end code (EOL). when the result in step 502 is NO, the image data is decoded by the coder/decoder 7 and stored in the line buffer in step 503. On the other hand, when the result in step 502 is YES, step 504 determines whether or not the process for one page is completed. When the result in step 504 is NO, a flag (FLB) which represents a condition where the image data for one line is stored in the line buffer is set in step 505. After that, the process returns to step 501 and the process for the next line starts. When the result in step 504 is YES, as the image data for one page has been decoded, the process is completed.

In the interrupt process shown in FIG. 15, step 601 determines whether or not the flag (FLB) is set. When the result in step 601 is NO, the image data which must be recorded is incomplete so that the process immediately returns to the initial state in the interrupt process When the result in step 601 is YES, step 602 determines whether or not the number (LN) of lines for the image data stored in the line buffer is equal to or greater than a predetermined reference value C (LN≧C). When the result in step 602 is YES, the process in step 603 is performed. In step 603, the CPU 1 supplies the image data for one line to the thermal head driving portion 19 in the plotter 5 and supplies a high-speed mode instruction code to the plotter 5. Thus, the motor driving portion 21 drives the stepping motor 2 at the high-speed mode. On the other hand, when the result in step 602 is NO, the process in step 604 is performed. In step 604, the CPU 1 supplies the image data for one line to the thermal head driving portion 19 in the plotter 5 and supplies a low-speed mode instruction code to the plotter 5. Thus, the motor driving portion 21 drives the stepping motor 22 at the low-speed mode.

The recording control is performed as has been described above so that the line buffer does not overflow. That is, when the number of lines in the empty area in the line buffer is small, the image is recorded on the recording sheet at the high-speed mode and when the number of the lines in the empty area in the line buffer is large, the image is recorded on the recording sheet at the low-speed mode. Therefore, it is possible to successively record the image on the recording sheet. In addition, the power consumed by the stepping motor 22 decreases at the low-speed mode.

For example, the moving speed of the recording sheet in the low-speed mode is half that of the high-speed mode. In this case, the thermal head 20 records the image for one line in a first amount of time in the high-speed mode and records the image data for one line in a second amount of time in the low-speed mode. The duration of the first time is determined as being half that of the second time. The stepping motor 22 in the plotter 5 ca be driven at the high-speed mode and the low-speed mode in the same manner as the stepping motor 18 in the scanner 4. That is, in the high-speed mode, the stepping motor 22 can be driven in accordance with the two-phase excitation method as shown in FIG. 12. In the low-speed mode, the stepping motor 22 can be driven in accordance with the one-two phase excitation method as shown in FIG. 13.

In the scanner 4, it is also possible to move an optical system such as the CCD line image sensor 14. That is, the optical system moves over the document so that the scanning of the document is performed.

In this embodiment, the recording apparatus uses a thermal recording paper as the recording sheet. In the present invention, it is possible to record the image in accordance with another recording method.

It is also possible to control the speed of the scanning so that a speed is selected from three or more speeds.

According to the present invention, when the image is recorded, the line buffer is prevented from overflowing and it is possible to record the image successively.

The present invention is not limited to the aforementioned embodiments, and variations and modifications may be made without departing from the scope of the claimed invention.

What is claimed is:

1. An image reading apparatus comprising:
   scanning means for scanning a medium on which an image is formed and for outputting an image data corresponding to the image on said medium;
   buffer means having a predetermined capacity, coupled to said scanning means, for storing the image data output from said scanning means;
   first processing means, coupled to said buffer means, for processing the image data supplied from said buffer means in accordance with a predetermined procedure and for outputting a first process image data;
   storage means for storing, at different times, the image data supplied from the buffer means and the first process image data output from the first processing means in accordance with a predetermined procedure; and
   control means for supplying the image data in said buffer means to said storage means when the amount of image data stored in said buffer means is greater than a predetermined reference value, and for supplying the first process image data output from first processing means to said storage means when the amount of image data stored in said buffer means is less than the predetermined reference value.

2. An image reading apparatus as claimed in claim 1, wherein said control means has judgment means for judging whether or not the image data stored in said buffer means is greater than the predetermined reference value, first control means for supplying the image data in said buffer means to said storage means when a result obtained by said judgment means is yes, second control means for supplying the first process image data output from said first processing means to said storage means when the result obtained by said judgment means is no.

3. An image reading apparatus as claimed in claim 1, wherein said first processing means has coder means for coding and compressing the image data supplied from said buffer means and for outputting a compressed image data as the first process image data.

4. An image reading apparatus as claimed in claim 3, wherein said storage means has image storing means for storing, at different times, the image data supplied from said buffer means and the compressed image data output from said coder means.

5. An image reading apparatus as claimed in claim 4, wherein said scanning means has a line image sensor for reading the image formed on said medium and for outputting a image signal corresponding to every line of the image, and driving means for driving said line image sensor and for converting the image signal output from said line image sensor into the image, wherein the image data output from said driving means is stored in said buffer means line by a line.

6. An image reading apparatus as claimed in claim 5, wherein said control means judgment means for judging whether or not the amount of lines for image data stored in said buffer means is greater than a predetermined reference value, first supplying means for supplying the image data in the buffer means to said image storage means when a result obtained in said judgment means is yes, and second supplying means for supplying the compressed image data output from said coder means to said image storage means when the result obtained in said judgment means is no.

7. An image reading apparatus comprising:
scanning means for scanning a medium on which an image is formed and outputting an image data corresponding to the image on said medium;
buffer means having a predetermined capacity, coupled to said scanning means, for storing the image data output from said scanning means;
processing means, coupled to said buffer means, for processing the image data supplied from said buffer means in accordance with a predetermined procedure; and
control means for controlling a scanning speed of said scanning means in accordance with the amount of image data stored in said buffer means, said control means comprising:
first judgment means for judging whether or not the amount of the image data stored in said buffer means is greater than a predetermined reference value,
first speed control means for controlling the scanning speed at a first speed when a result obtained by said first judgment means is no, and
second speed control means for controlling the scanning speed of said canning means at a second speed which is less than the first speed when the result obtained by said first judgment means is yes,
wherein said driving means has a stepping motor for moving said medium in a predetermined direction and an image sensor for reading an image on said medium, said image sensor scanning said medium moved by said stepping motor, wherein said first speed control means has first drive control means for driving said stepping motor at a first speed when a result obtained by said first judgment is no, and wherein said second speed control means has second drive control means for driving said stepping motor at a second speed which is less than the first speed when the result obtained by said first judgment means is yes, and
wherein said stepping motor is a four phase stepping motor, and wherein said first driving means has first means for driving said stepping motor in accordance with a two-phase excitation method and said second driving means has second means for driving said stepping motor in accordance with a one-two excitation method.

* * * * *